(12) United States Patent
Bae

(10) Patent No.: US 6,733,096 B2
(45) Date of Patent: May 11, 2004

(54) DUAL-HINGED COVER OF CONSOLE BOX FOR AUTOMOBILE

(75) Inventor: Bong Yull Bae, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/315,776

(22) Filed: Dec. 10, 2002

(65) Prior Publication Data

US 2003/0209956 A1 Nov. 13, 2003

(30) Foreign Application Priority Data

May 7, 2002 (KR) .................. 10-2002-0024992

(51) Int. Cl.[7] ............................................. A47B 88/00
(52) U.S. Cl. .................. 312/324; 312/405; 312/326; 16/230
(58) Field of Search ................ 312/324, 326, 312/327, 328, 329, 405; 16/229, 230, 231; 296/37.8; 224/42.11, 275; 297/188.15, 188.14; 108/44, 45; 220/343, 263, 334, 230; 49/192

(56) References Cited

U.S. PATENT DOCUMENTS

| | | | | | |
|---|---|---|---|---|---|
| 4,059,924 | A | * | 11/1977 | Bierlich | 49/192 |
| 4,132,034 | A | * | 1/1979 | Van Siclen | 49/382 |
| 4,532,673 | A | * | 8/1985 | Kim | 16/233 |
| 5,187,836 | A | * | 2/1993 | Kim et al. | 16/231 |
| 5,210,906 | A | * | 5/1993 | Aihara et al. | 16/232 |
| 5,530,992 | A | * | 7/1996 | Baermann | 16/231 |
| 5,647,652 | A | * | 7/1997 | Zalewski et al. | 312/324 |
| 5,737,939 | A | * | 4/1998 | Valence et al. | 62/441 |
| 5,926,916 | A | * | 7/1999 | Lee et al. | 16/230 |
| 6,000,771 | A | * | 12/1999 | Wissinger et al. | 312/405 |
| 6,003,716 | A | | 12/1999 | Allison et al. | |
| 6,250,729 | B1 | | 6/2001 | Allison et al. | |
| 6,276,562 | B1 | * | 8/2001 | Hodge et al. | 220/831 |

* cited by examiner

*Primary Examiner*—Peter M. Cuomo
*Assistant Examiner*—Erika Garrett
(74) *Attorney, Agent, or Firm*—Morgan Lewis & Bockius LLP

(57) ABSTRACT

Disclosed is a dual-hinged cover of a console box for an automobile. The console box, which is installed between a driver seat and an assistant seat, has an operation mechanism containing two pairs of links and rods so that the cover can be opened and closed with equal convenience from either seat. On the hinging side of the cover the leading ends of the rods move away from a shaft and are received into recesses while on the opening side the leading ends move toward the shaft until released from the recesses. Thus, the cover can be selectively opened and closed from the driver seat and the passenger seat according to the operation mechanism.

9 Claims, 3 Drawing Sheets

DUAL-HINGED COVER OF CONSOLE BOX FOR AUTOMOBILE

FIELD OF THE INVENTION

The present invention relates to a console box for an automobile, and more particularly to a dual-hinged cover structure for the console box, which in a preferred embodiment can be opened and closed from two sides through a bi-directionally operating element and links connected to the operating element that function as hinges. Using the invention the cover is opened and closed from the driver seat and passenger seat with equal ease.

BACKGROUND OF THE INVENTION

Generally, a console box for an automobile is disposed between a driver seat and a passenger seat on a floor. The box includes a body for containing goods, and a cover that is combined with the body to cover the goods. The cover is opened to remove goods from the console. Typically, the cover of the console box is structured to be opened from the rear. In an automobile having an A/V monitor, however, space for the opened cover cannot be guaranteed.

Console boxes having dual opening covers have been developed. For example, U.S. Pat. No. 6,003,716 discloses a console box having a dual open cover. In this conventional console box the cover is provided with a support bar for connecting the housing of the cover to a body of the console box to support the cover, so as to be easily opened and closed from the driver seat and the passenger seat. But the space in the console body is reduced due to the support bar, and the complicated structure also detracts from its appearance. Additionally, U.S. Pat. Nos. 5,647,652 and 6,250,729 disclose a console box having a cover opened and closed from two directions by means of a hinge member. These solutions are unsatisfactory since the locking mechanisms are projected outside the cover and decrease the utility of the box.

SUMMARY OF THE INVENTION

In a preferred embodiment of the invention a dual-hinged cover for a console box for an automobile comprises: a shaft which is disposed to be traverse across a housing of a cover; an operation mechanism having a push button attached to both ends of the shaft and an elastic member for urging the push button; rods which are connected to one end of the operation mechanism with the shaft therebetween, and of which leading ends are disposed to be reciprocated along a guide portion and be received by and released from recesses formed at both sides of a body of the console box; and two pairs of links of which one end is connected to the rod and the other end is connected to the shaft, for transmitting operation force of the shaft to the rods.

The mechanism operates so that when a push button is pushed, while the rods connected to the one pair of links are released from the recesses, the other of links operates so that the rods connected to the other pair of links are further inserted into the recesses. Thus, the links carry out locking or releasing the rod as the operation mechanism is operated.

In an additional preferred embodiment of the invention a dual-hinged cover for a console box comprises: a cover; and an operation mechanism, comprising: a shaft disposed across a cover; a first push button attached to a first end of the shaft; a second push button attached to a second end of the shaft; first and second elastic members for urging against the first and second push buttons, respectively; a first pair of rods, each rod having one end linked to the shaft with the shaft situated between the first pair of rods; a second pair of rods, each rod having one end linked to the shaft with the shaft situated between the second pair of rods, and each rod from said first and second pairs having a leading end situated in a guide portion and reciprocating so as to be received in and be released from a corresponding recess formed in the console box; a first pair of links for linking the first pair of rods to the shaft, each link having a first end pivotally connected to the shaft near the first end of the shaft and a second end pivotally connected to a rod; and a second pair of links for linking the second pair of rods to the shaft, each link having a first end pivotally connected to the shaft near the second end of the shaft and a second end pivotally connected to a rod.

A console box with a dual-hinged cover, according to an alternative embodiment of the invention comprises: a cover; a console box with a first pair of recesses that define a first axis about which the cover pivots and a second pair of recesses that define a second axis about which the cover pivots; and an operation mechanism, comprising: a shaft situated across the cover approximately perpendicular to both the first and the second axes, the shaft having first and second ends; an elastic member urging the shaft back to an initial position; a first pair of rods, each rod having one end linked to the shaft and having a leading end situated in a guide portion and reciprocating so as to be received in and be released from one of the first pair of recesses, with the first pair of rods situated on either side of the shaft towards the first end of the shaft; a second pair of rods, each rod having one end linked to the shaft and having a leading end situated in a guide portion and reciprocating so as to be received in and be released from one of the second pair of recesses, with the second pair of rods situated on either side of the shaft towards the second end of the shaft; a first pair of links, each link connected to one of said first pair of rods and causing movement of the shaft to reciprocate the corresponding rod; and a second pair of links, each link connected to one of said second pair of rods and causing movement of the shaft to reciprocate the corresponding rod, wherein when the shaft is pushed from the second axis towards the first axis, the first pair of rods are received by the first pair of recesses and the second pair of rods are released from the second pair of recesses, and the cover can be pivoted about the first axis and wherein when the shaft is pushed from the first axis towards the second axis, the second pair of rods are received by the second pair of recesses and the first pair of rods are released from the first pair of recesses, and the cover can be pivoted about the second axis.

BRIEF DESCRIPTION OF THE DRAWINGS

The present invention will become readily apparent by reference to the following detailed description when considered in conjunction with the accompanying drawings, in which.

Like numerals refer to similar elements throughout the several drawings.

DETAILED DESCRIPTION OF THE PREFERRED EMBODIMENT

Figure 1:
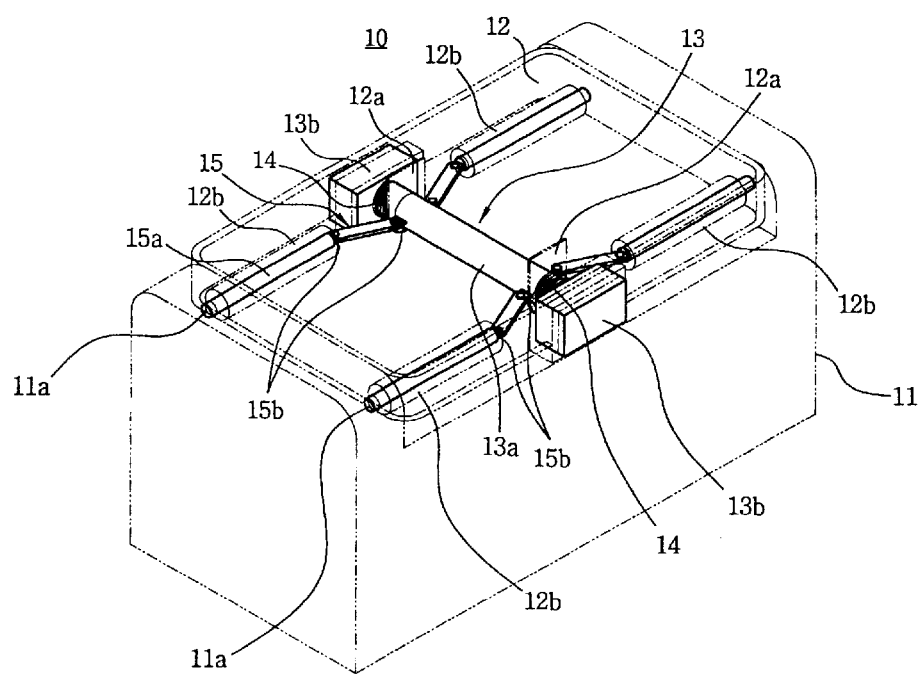
FIG. 1 is a perspective view of a dual-hinged cover for a console box according to an embodiment of the present invention.

As shown in FIG. 1, the console box 10 is provided with a body 11 enclosing a space to contain goods and a cover 12, which is hinged to the body 11 and may be opened and closed from two sides. An operation mechanism 13 is used to open and close the cover 12 and is installed in the cover 12. The cover 12 is pivotally rotated about a hinge shaft and is opened or closed depending on how the operation mechanism 13 is operated.

In the console box 10 having the dual-hinged cover according to the present invention, the operation mechanism 13 includes a shaft 13a, and push buttons 13b mounted on both ends of the shaft 13a. The operation mechanism 13 is supported by means of supporting portions 12a that are disposed along an axis of the shaft 13a at a position near the push button 13b. Springs 14 are elastically installed about the shaft 13a between the push buttons 13b and supporting portion 12a. Springs 14 force the shaft 13a to move the operation mechanism 13 to an initial position.

The operation mechanism includes two pairs of rods 15a which are connected to the shaft 13a and move as the shaft 13a moves. Two pair of links 15 having joints 15b connect shaft 13a to rods 15a, causing them to move when shaft 13a moves. The rods 15a extend away from the shaft 13a. Each pair of rods 15a share a common axis. The leading ends of each rod are inserted into recesses 11a formed in a side of the body 11.

One pair of links 15 is connected to one end of the shaft 13a and the other pair of links 15 is coupled to the other end of the shaft 13a. The rods 15a extend through and are guided by a guide portion 12b which is integrally formed in the cover 12. The links 15 move with the operation mechanism 13. As the operation mechanism 13 is operated, one pair of links 15 moves away from the center of the cover 12 to become more in-line with the rods 15a that are attached. At the same time, the other pair of the links moves towards the center of cover 12, becoming less in-line with the attached rods 15a.

In this manner, the rods 15a at the one end of the operation mechanism 13 are further inserted into the recess 11a, while the rods 15a at the other end of the operation mechanism 13 are released from the recess 11a. By doing this a driver or passenger can selectively operate the operation mechanism 13 to open and close the cover 12.

Figure 2:
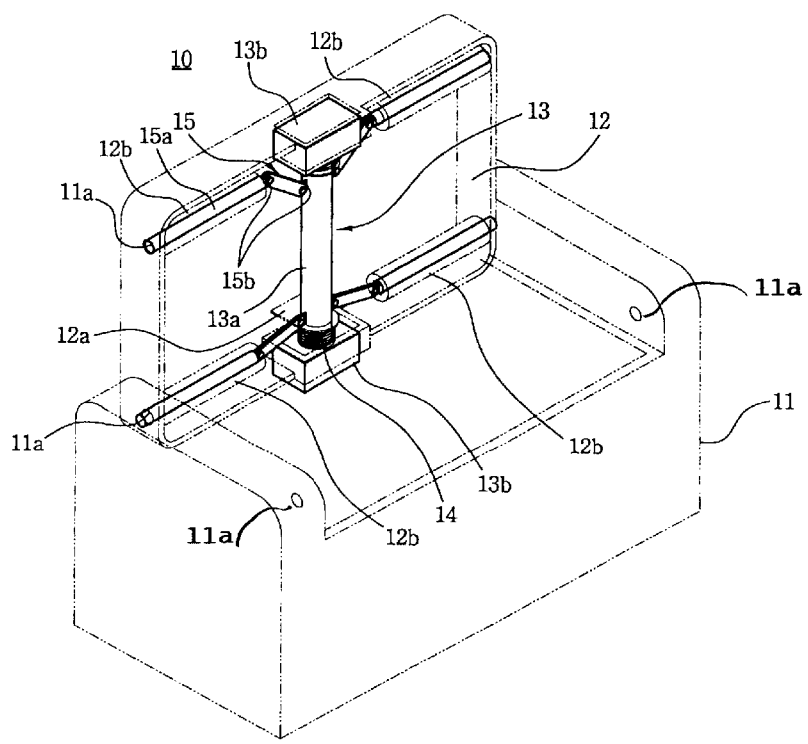
FIG. 2 is a perspective view illustrating the operation of the embodiment shown in FIG. 1 from the driver's seat.

Now referring to FIG. 2, when the driver pushes the push button 13b of the operation mechanism 13 to open the cover 12. The spring 14 elastically installed about the shaft 13a nearest to the pushed button 13b is compressed against the supporting portion 12a. The rods 15a connected to the end of the shaft 13a furthest from the pushed button move along the guide portion 12b and are further inserted into the recesses 11a. The links 15 connected to the end of the shaft 13 nearest the pushed button 13b move along the guide portion 12b and the connected rods 15a exit from the recess 11a.

To open the cover 12, the driver lifts the side of the cover 12 when the rods 15a have exited from the recess 11a and pivots the cover 12 about the rods 15a that remain inserted into the recess 11a. Conversely, to close the cover 12, the driver rotates the cover 12 about the links 15 that remain inserted into the recess 11a until cover 12 is in the closed position and releases the pushed button 13b so that the links 15 are returned, by means of the spring 14, to the initial state where both pairs of rods 15a are in the recesses 11a.

Figure 3:
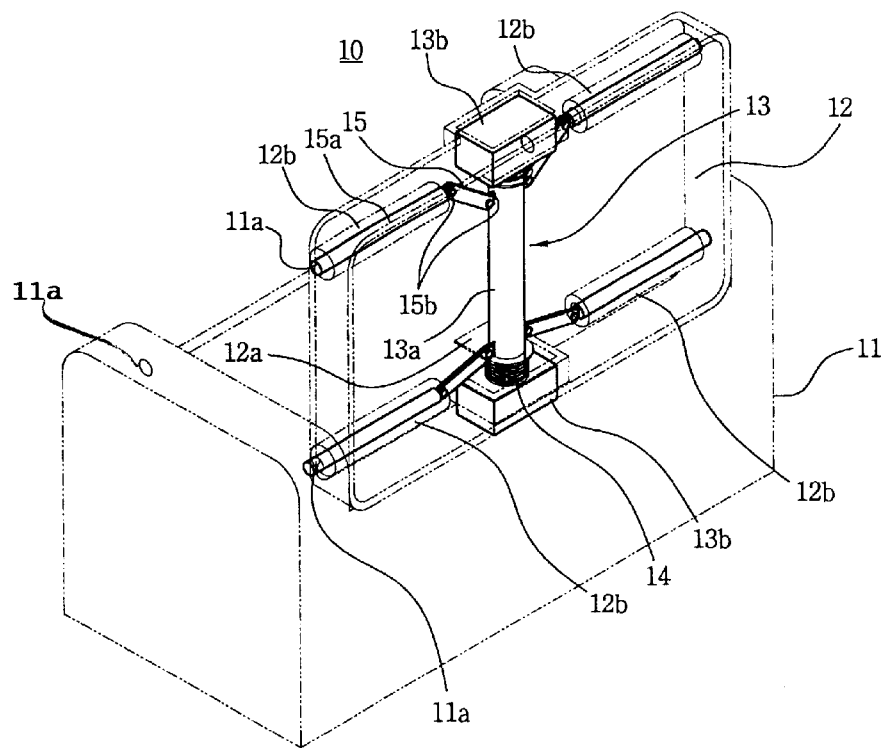
FIG. 3 is a view illustrating the operation of the embodiment shown in FIG. 1 from the passenger's seat.

Referring to FIG. 3, the passenger can open and close the cover 12 of the console box 10 in the manner as described above by operating the dual-hinged cover from the other side. In the console box 10 having the dual-hinged cover, therefore, the driver and passenger can both open and close the cover in the same manner from their respective seating positions, improving the convenience of the console box. Furthermore, as the links are contained in the cover the space for receiving goods is maximized, thereby increasing the utility of the console.

Although the preferred embodiments of the present invention have been described, it is understood that the present invention should not be limited to these preferred embodiments. The various changes and modifications that would be apparent to one skilled in the art that are within the spirit and scope of the present invention are included within the following claims.

What is claimed is:

1. A dual-hinged cover for a console box, comprising:
   a shaft traversing a housing of a cover;
   first and second push buttons attached to opposite ends of the shaft;
   first and second elastic members for urging against the first and second push buttons;
   four rods, with a first pair of rods linked to the shaft near the first push button and a second pair of rods linked to the shaft near the second push button, leaving the majority of the shaft between the first and second pairs of rods, wherein said rods are disposed to reciprocate in a guide portion of the cover so an end of each rod is received by and released from a corresponding recess in a body of the console box;
   a first pair of links connecting the first pair of rods to the shaft and configured to transmit the movement of the shaft to the first pair of rods; and
   a second pair of links connecting the second pair of rods to the shaft and configured to transmit the movement of the shaft to the second pair of rods.

2. The dual-hinged cover of claim 1, wherein said first and second pairs of rods are operate so that, when either said first push button or said second push button is pushed, as the ends of the rods of one of said pairs are released from the corresponding recesses, the ends of the rods of the other of said pairs are inserted into the corresponding recesses.

3. The dual-hinged cover of claim 1, wherein the first and second pair of links transmit the movement of the shaft when either the first push button or the second push button is pushed.

4. A dual-hinged cover for a console box, comprising:
   a cover; and
   an operation mechanism, comprising:
   a shaft disposed across a cover;
   a first push button attached to a first end of the shaft;
   a second push button attached to a second end of the shaft;
   first and second elastic members for urging against the first and second push buttons, respectively;
   a first pair of rods, each rod having one end linked to the shaft with the shaft situated between the first pair of rods;
   a second pair of rods, each rod having one end linked to the shaft with the shaft situated between the second pair of rods, and each rod from said first and second pairs having a leading end situated in a guide portion and reciprocating so as to be received in and be released from a corresponding recess formed in the console box;
   a first pair of links for linking the first pair of rods to the shaft, each link having a first end pivotally connected to the shaft near the first end of the shaft and a second end pivotally connected to a rod; and a second pair of links for linking the second pair of rods to the shaft, each link having a first end pivotally connected to the shaft near the second end of the shaft and a second end pivotally connected to a rod.

5. The dual-hinged cover for a console box of claim 4, wherein when the push button nearest the first pair of links is pushed, the shaft moves the first pair of links, so that the first pair of rods are released from the corresponding recesses, and the second pair of links, so that the second pair of rods are further inserted into the corresponding recesses.

6. The dual-hinged cover for a console box of claim 4, wherein when the shaft is moved by the pushing one of the push buttons, the pair of links nearest the pushed push button works to remove the rods attached thereto from the corresponding recesses and the pair of links furthest from the pushed push button works to insert the rods attached thereto further into the corresponding recesses.

7. The dual-hinged cover for a console box of claim 5, wherein when the shaft is moved by the pushing one of the push buttons, the pair of links nearest the pushed push button works to remove the rods attached thereto from the corresponding recesses and the pair of links furthest from the pushed push button works to insert the rods attached thereto further into the corresponding recesses.

8. The dual-hinged cover for a console box of claim 4, wherein when the first pair of rods are received by the corresponding recesses and the second pair of rods are released from the corresponding recesses, the first pair of rods serve as a first hinge about which the cover pivots, and when the second pair of rods are received by the corresponding recesses and the first pair of rods are released from the corresponding recesses, the second pair of rods serve as a second hinge about which the cover pivots.

9. A dual-hinged cover for a console box, comprising:
   a cover; and
   an operation mechanism, comprising:
      a shaft traversing the cover and having a first end and a second end;
      a spring for urging the shaft toward an initial position;
      a first pair of rods serving as a first hinge on a first side of the cover when said first pair of rods are inserted into corresponding first recesses formed in the console box;
      a second pair of rods serving as a second hinge on a second side of the cover when said second pair of rods are inserted into corresponding second recesses formed in the console box; and
      a plurality of links connecting the shaft to each said rod and transmitting movement of the first shaft end and the second shaft end so that said rods reciprocate, wherein each said rod when reciprocated is alternatingly inserted into or released from the corresponding recess, and wherein one of said pairs serves as a hinge if the other of said pairs is released from the corresponding recesses.

* * * * *